United States Patent
Narayanappa et al.

(10) Patent No.: US 12,366,097 B2
(45) Date of Patent: Jul. 22, 2025

(54) STOWABLE VEHICLE DOOR SECURING SYSTEM AND APPARATUS

(71) Applicant: Textron Innovations Inc., Providence, RI (US)

(72) Inventors: Savithramma Narayanappa, Bangalore (IN); Sheshaprasad Hassan Subramanya, Bangalore (IN); Timothy Carr, Fort Worth, TX (US); Bobby Howard Mosier, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 97 days.

(21) Appl. No.: 17/868,330

(22) Filed: Jul. 19, 2022

(65) Prior Publication Data
US 2024/0026717 A1    Jan. 25, 2024

(51) Int. Cl.
*E05C 17/14* (2006.01)
*B64C 1/14* (2006.01)

(52) U.S. Cl.
CPC ............ *E05C 17/14* (2013.01); *B64C 1/1423* (2013.01)

(58) Field of Classification Search
CPC ........ E05C 17/14; E05C 19/18; E05C 19/182; B64C 1/1423; Y10T 292/28; E05D 11/06
See application file for complete search history.

(56) References Cited

U.S. PATENT DOCUMENTS

| | | | | |
|---|---|---|---|---|
| 163,621 A | * | 5/1875 | Zimmerman | E05C 17/14 232/1 R |
| 955,728 A | * | 4/1910 | Watrous | E05C 17/22 292/262 |
| 1,392,606 A | * | 10/1921 | Stoch | E05C 17/14 292/266 |
| 1,597,274 A | * | 8/1926 | Herrmann | E05F 3/16 16/DIG. 9 |
| 2,121,766 A | * | 6/1938 | Wicks | E05C 17/50 292/DIG. 19 |
| 2,140,849 A | * | 12/1938 | Opland | E05C 17/14 49/67 |
| 2,374,426 A | * | 4/1954 | Diederich | E05C 17/14 217/60 B |
| 2,742,312 A | * | 4/1956 | Oswald | E05C 17/14 292/241 |
| 2,806,728 A | * | 9/1957 | Svensson | E05C 17/14 292/271 |
| 2,899,095 A | * | 8/1959 | Figaretti | E05C 17/14 217/61 |
| 3,716,260 A | * | 2/1973 | Herlein | E05C 17/50 292/DIG. 19 |
| 4,172,611 A | * | 10/1979 | Krus | B60K 15/05 292/338 |

(Continued)

*Primary Examiner* — Jason W San
*Assistant Examiner* — Matthew J Sullivan
(74) *Attorney, Agent, or Firm* — Akona IP PC

(57) ABSTRACT

Disclosed is an apparatus for maintaining a position of a vehicle door relative to a vehicle frame may include a link and a fastener. The link may have a first end and a second end. The first end may have a loop and the first end may be at an opposite end of the link from the second end. The fastener may be on a surface of the link and may be configured to fasten the link to the vehicle frame. A hook may be on the second end. The loop may be an arc or an incomplete circular portion. The vehicle may be a rotorcraft vehicle.

20 Claims, 4 Drawing Sheets

(56) References Cited

U.S. PATENT DOCUMENTS

| | | | | |
|---|---|---|---|---|
| 4,181,337 A * | 1/1980 | Muller | E05C 17/14 | 16/404 |
| 4,270,784 A * | 6/1981 | Vanover | B60K 15/05 | 292/338 |
| 4,301,570 A * | 11/1981 | Thomas | E05D 11/06 | 16/85 |
| 4,593,946 A * | 6/1986 | Rich | E05C 21/005 | 292/288 |
| 4,762,351 A * | 8/1988 | Bowman | E05C 17/32 | 292/263 |
| 5,387,018 A * | 2/1995 | Pinkerton | E05B 15/1607 | 292/259 R |
| 5,551,738 A * | 9/1996 | Thorlton | E05C 17/042 | 292/288 |
| 7,226,091 B2 * | 6/2007 | Amy | E05C 17/14 | 292/262 |
| 7,971,320 B2 * | 7/2011 | Fain | E05D 11/06 | 16/366 |
| 8,177,266 B2 * | 5/2012 | Yates | E05C 17/54 | 292/288 |
| 8,214,971 B2 * | 7/2012 | Carter | E05F 1/1292 | 292/262 |
| 8,231,152 B2 * | 7/2012 | Carlson | E05C 17/042 | 24/599.6 |
| 8,413,382 B2 * | 4/2013 | Uto | E05D 11/06 | 49/381 |
| 8,549,711 B2 * | 10/2013 | Apostoloff | E05D 11/06 | 16/374 |
| 9,238,931 B1 * | 1/2016 | Lewis | B60R 99/00 | |
| 9,347,251 B1 * | 5/2016 | Lewis | B60R 99/00 | |
| 9,797,173 B2 * | 10/2017 | Claxton | E05C 17/50 | |
| 10,807,693 B2 * | 10/2020 | Harp | B64C 1/24 | |
| 11,414,906 B1 * | 8/2022 | Tallent | E05D 11/1007 | |
| 2005/0091790 A1 * | 5/2005 | Mazzone | E05F 5/025 | 16/82 |
| 2020/0347656 A1 * | 11/2020 | Groninga | B64C 1/1438 | |
| 2022/0372806 A1 * | 11/2022 | Throop | E05D 11/06 | |

\* cited by examiner

STOWABLE VEHICLE DOOR SECURING SYSTEM AND APPARATUS

CROSS REFERENCE TOR ELATED APPLICATIONS

Not applicable.

STATEMENT REGARDING FEDERALLY SPONSORED RESEARCH OR DEVELOPMENT

Not applicable.

TECHNICAL FIELD OF THE DISCLOSURE

The present disclosure relates, in general, to an emergency hold open feature for a hinged door of a vehicle.

BACKGROUND

Many vehicles are provided with access doors such as a hood, passenger door, hatchback, or truck bed topper door which is raised or otherwise opened to provide access to the engine compartment, truck bed, or interior of the vehicle. Some of these vehicles access doors are also equipped with a hydraulic cylinder and rod combination, known as a gas prop or strut, which is designed to hold the access door in its fully open position. Specifically, these gas props are intended to provide sufficient resistance to the weight of the access door to prevent gravity, wind or some other force from causing the access door to drop or otherwise close; however, this resistance can be overcome by manually applying additional force to the access door to thereby close it.

In emergency evacuation situations, it may be necessary to ensure that a door remains open against wind forces so that people can safely exit a vehicle or other enclosure. Wind forces, for example, can result in forces as high as five hundred pounds across a surface of a door. Gas props should, therefore, be able to withstand such forces or be assisted by other mechanisms that prevent doors from overcoming the resistive force of a gas prop.

The hydraulic cylinders in such gas props tend to become defective over time, which causes them to fail to support the access door in an open position for a prolonged or for any period of time. In the most severe instances of such failures, the gas prop may hold the access door open at first, but then when a person is positioned underneath the access door, the cylinder may fail thus causing the access door to strike the person, causing pain and/or injury. Accordingly, it is desirable to provide a system that mitigates the failure of the gas props used to support access doors.

SUMMARY

Implementations of an apparatus for maintaining a position of a vehicle door relative to a vehicle frame may include a link and a fastener. The link may have a first end and a second end. The first end may have a loop and the first end may be at an opposite end of the link from the second end. The fastener may be on a surface of the link and may be configured to fasten the link to the vehicle frame. A hook may be on the second end. The loop may be an arc or an incomplete circular portion. The vehicle may be a rotorcraft vehicle.

The link may have a cross section along a longitudinal direction that includes a width dimension that is no more than twenty percent the size of a length dimension of the link. The link may be configured to withstand, in a longitudinal direction, a tensile force of at least four hundred pounds and a compressive force of at least five hundred pounds.

The fastener may be about half-way between the first end and the second end. The fastener may partially be a hook and pile fastener and partially a magnetic fastener.

A further implementation may be an assembly for maintaining a position of a vehicle door relative to a vehicle frame, which may include a link, a first bracket, a second bracket and a fastener. The link may have a first end and a second end. The first end may have a partial loop and the first end may be at an opposite end of the link from the second end. The first bracket may be configured to attach to the vehicle door and engage the first end. The second bracket may be configured to attach to the vehicle frame and to engage the second end. The fastener may be on a surface of the link and may be configured to fasten the link to the vehicle frame. A hook may be on the second end. The loop may be an arc or an incomplete circular portion. The vehicle may be a rotorcraft vehicle.

The link of the assembly may have a cross section along a longitudinal direction that includes a width dimension that is no more than twenty percent the size of a length dimension of the link. The link of the assembly may be configured to withstand, in a longitudinal direction, a tensile force of at least four hundred pounds and a compressive force of at least five hundred pounds. The fastener may be about half-way between the first end and the second end, and the fastener may be a hook and pile fastener or a magnetic fastener.

A yet further implementation may be a vehicle that includes an assembly for maintaining a position of a door of the vehicle relative to a frame of the vehicle. The assembly may include a link, a first bracket, a second bracket and a fastener. The link may have a first end and a second end. The first end may have a partial loop and the first end may be at an opposite end of the link from the second end. The first bracket may be attached to the vehicle door and may be configured to engage the first end. The second bracket may be attached to a frame of the vehicle and may be configured to engage the second end. The fastener may be on a surface of the link and may be configured to fasten the link to the vehicle frame. A hook may be on the second end. The loop may be an arc or an incomplete circular portion. The vehicle may be a rotorcraft vehicle.

The link may have a cross section along a longitudinal direction that includes a width dimension that is no more than twenty percent the size of a length dimension of the link. The link may be configured to withstand, in a longitudinal direction, a tensile force of at least four hundred pounds and a compressive force of at least five hundred pounds. The fastener may be about half-way between the first end and the second end, and the fastener may be a hook and pile fastener or a magnetic fastener.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

Figure 1:
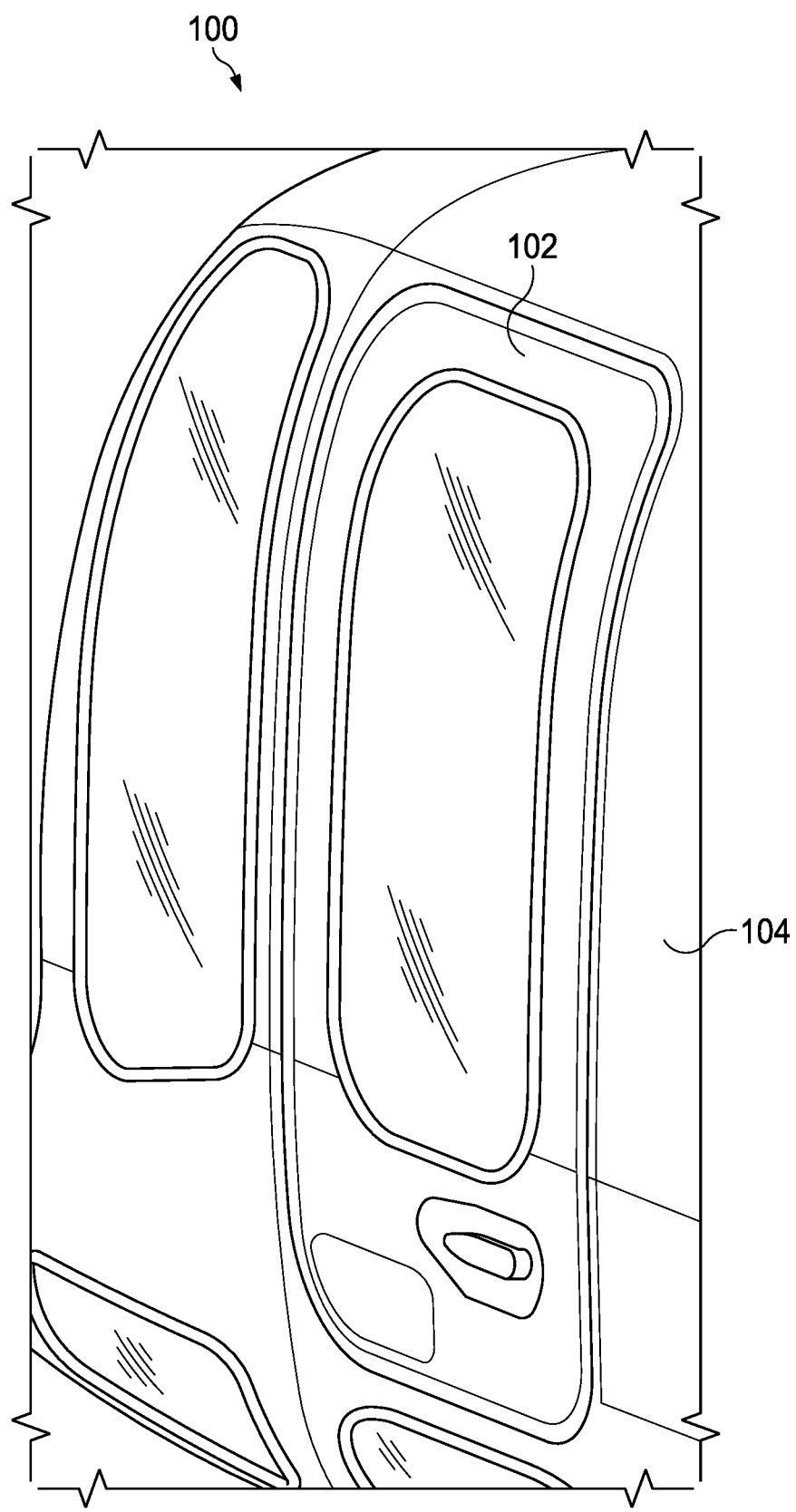
FIG. 1 illustrates a rotorcraft vehicle frame and a vehicle door in a closed configuration.

FIG. 1 illustrates a perspective view of a vehicle 100. The vehicle 100 may include a door 102 and a vehicle frame 104. The door 102 is illustrated in a closed configuration. The vehicle may be an airborne vehicle such as a helicopter or any other type of airborne vehicle. The vehicle may also be a land or sea based vehicle. Further, implementations of the present subject matter may be useful in structural environments such as buildings, bridges and tunnels.

The vehicle frame 104 is not necessarily limited to an element such as a chassis or traditional frame on which a vehicle body is mounted. For purposes of the present disclosure, the term vehicle frame may include a traditional vehicle frame, a vehicle body or any other element of a vehicle other than the vehicle door 102.

Figure 2:
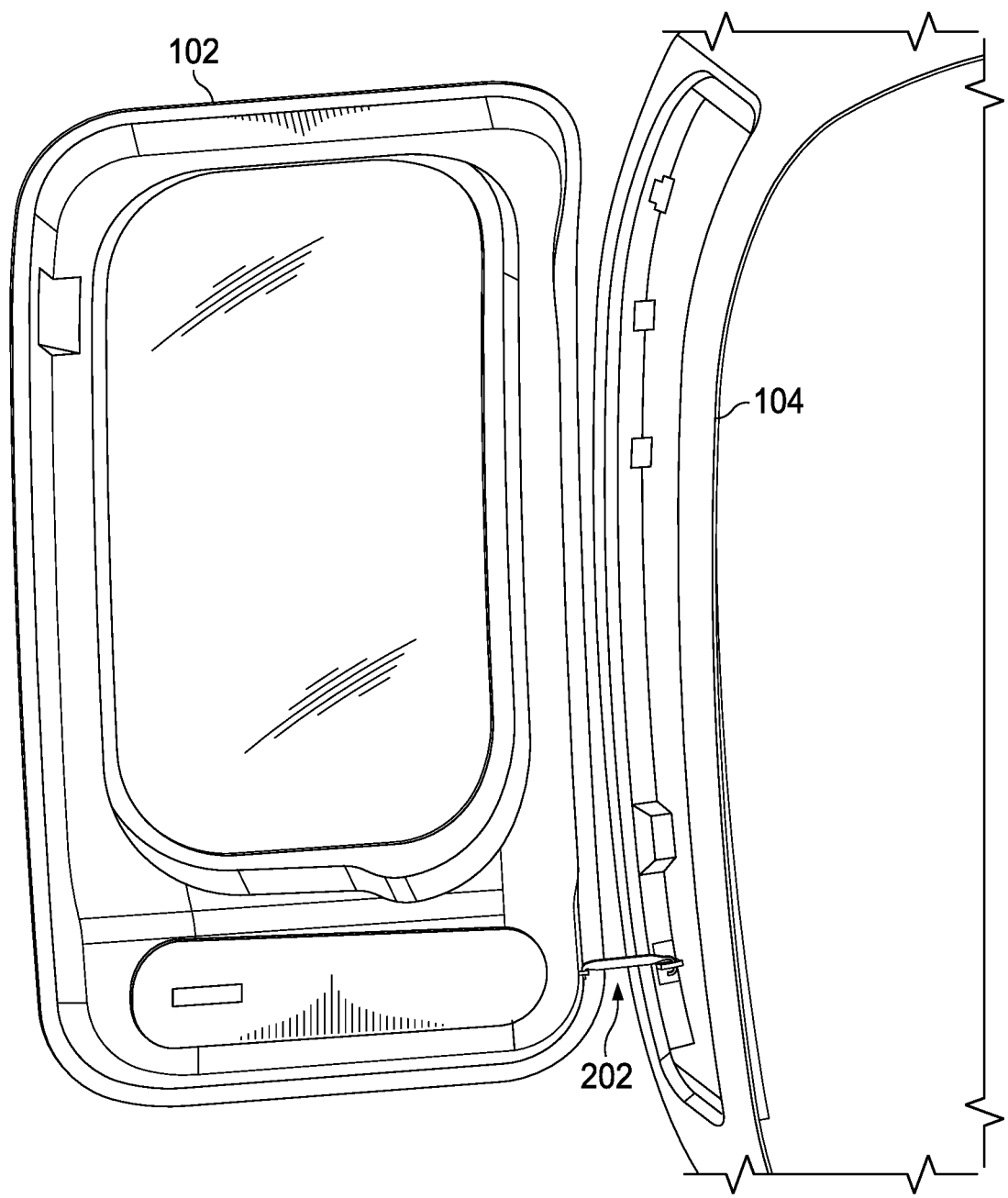
FIG. 2 illustrates the vehicle door of FIG. 1 in an opened position.

FIG. 2 illustrates a perspective view of the vehicle 100 with the door 102 in an open configuration. The open configuration of the door 102 may provide visibility of a link 202. Link 202 may extend from the door 102 to the frame 104 when the door is in an open configuration. The door 102 may be open to at least ninety degrees relative to the frame 104.

Figure 3:
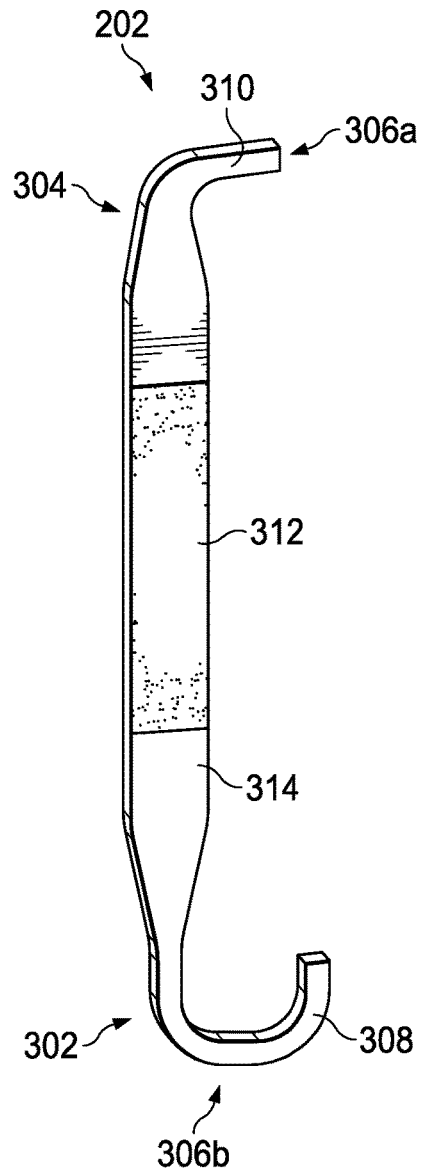
FIG. 3 illustrates a link.

FIG. 3 illustrates the link 202. The link 202 may include a first end 302 and a second end 304. The link 202 may be elongate and substantially planar in that it may have a cross section along a length thereof in which a width is multiple times larger than a height of the cross section.

The first end 302 may oppose the second end 304. The first end 302 and the second end 304 may include connectors 306a and 306b, respectively. For example, the first 302 end may include a loop 308 and/or the second end 304 may include a hook 310. The connectors 306a and 306b are not necessarily limited to hooks and loops and can be any type of mechanical and/or magnetic connector.

Figure 5:
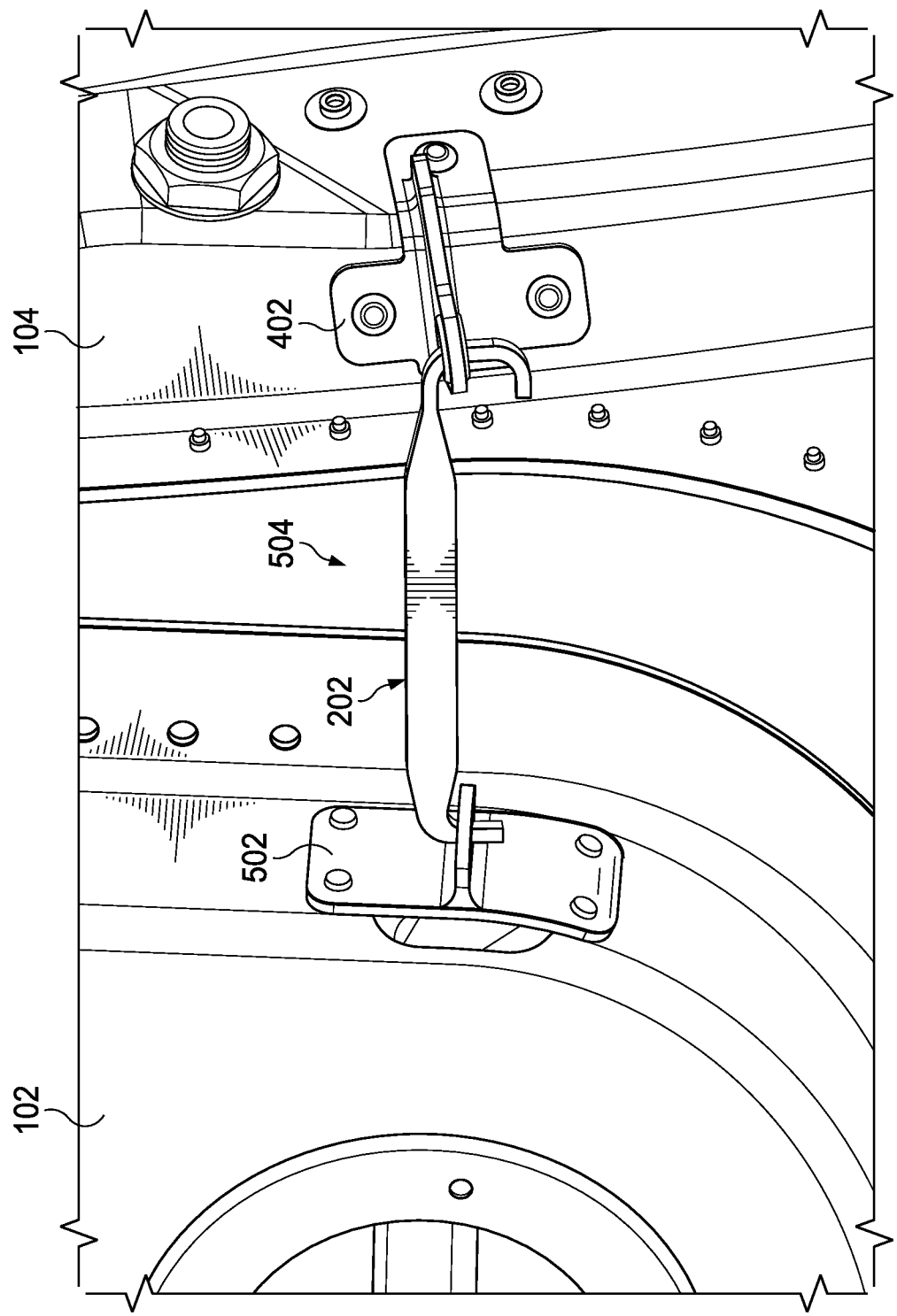
FIG. 5 illustrates the link of FIG. 3 in an engaged position.

A fastener 312 may be included on the link 202. The fastener 312 may provide a way to stow the link 202 when the link 202 is not in use. For example, a hook-and-pile type fastener 312, e.g., Velcro®, may be attached to a surface 314 of the used link 202 and to the vehicle frame 104. The surface 314 may be anywhere on the fastener. FIG. 5 illustrates surface 314 about mid-way between the first end 302 and the second end 304. The fastener 312 may extend the entire length of the link 202, including the connectors 306a and 306b, or the fastener 312 may extend along a portion of the link 202 that excludes the connectors 306a and 306b.

The fastener 312 is not limited to a hook-and-pile type fastener but may instead be a magnetic type of fastener in which a magnet is placed on one of the link 202 or the frame 104 and the mating link 202 or frame 104 is made of a metallic material to which the magnet may be secured. Various other forms of fasteners may also be used such as a mechanical button type fastener, a tie down, a slot for receiving the entire link 202, etc.

Figure 4:
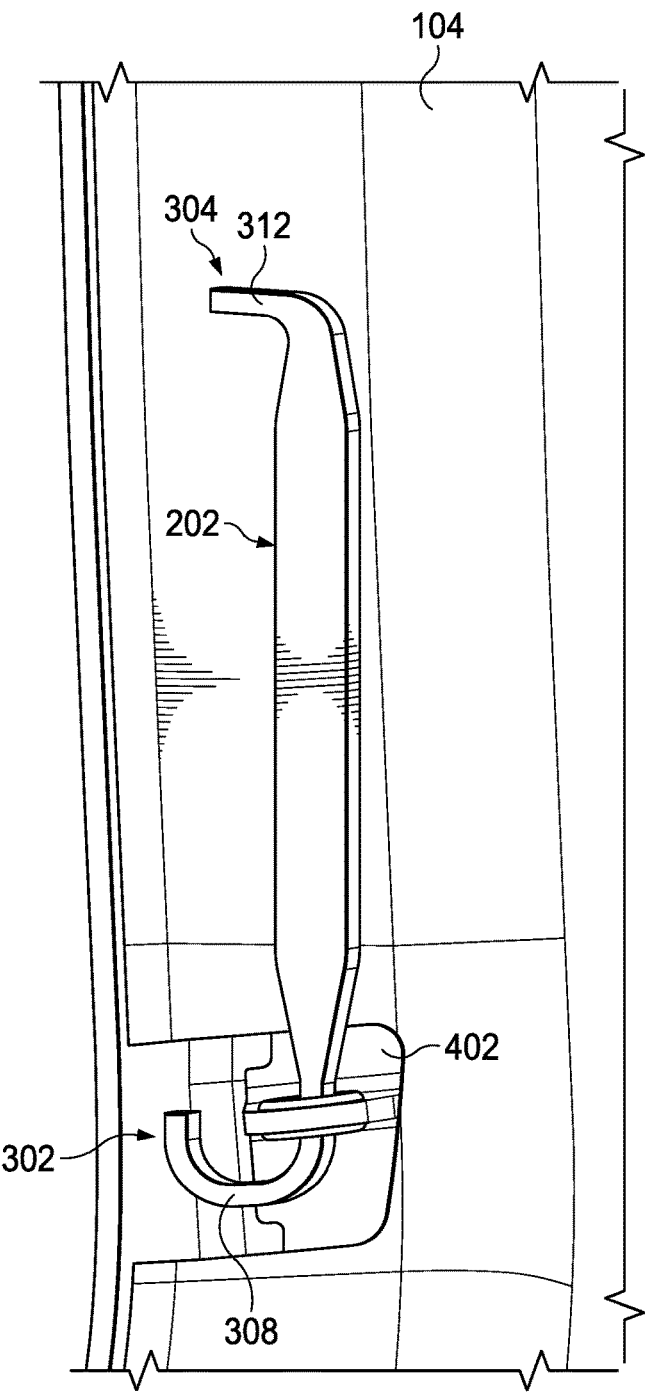
FIG. 4 illustrates the link of FIG. 3 in a stowed position.

FIG. 4 illustrates the link 202 in a stowed configuration. For example, the link 202 may fixedly engage the frame 104 by connecting the fastener 312 (not shown) on the link 202 to a mating fastener (not shown) on the frame 104. The loop 308 may engage a first bracket 402 which may be fixed to the frame 104. The bracket 402 may include a through-hole or a hook for receiving the loop 308. The loop 308 may be geometrically configured such that the link 202 is enabled to rotate at least 90 degrees without disengaging from the first bracket 402.

The link 202 may taper from the surface 314 toward either the first end 302 or the second end 304 or both the first end 302 and the second 302. The narrower cross section of the link toward the first end 302 may enable the link 202 to engage the first bracket 402 and the broader cross section of the surface 314 may prevent the link from passing too far into the bracket 402.

FIG. 5 illustrates the door 102 in an open and locked configuration. For example, the link 202 may be attached to the first bracket 402 and a second bracket 502. Similar to the first bracket, the second bracket 502 may include a through hole (not shown) and the first bracket 402 may also include a through hole or a hook (not shown). The hook 310 may engage the second bracket 502 via the through hole of the second bracket and the loop 308 may engage the first bracket 402 via the through hole of the first bracket.

The first bracket 402 and the second bracket 502 may be positioned on the frame 104 and on the door 102, respectively, so that the first bracket 402 does not interfere with the second bracket 502 when the door 102 is in a closed configuration. For example, the brackets 402 and 502 may be offset from each other in height from an underside of the vehicle. Alternatively, the brackets 402 and 502 may be at similar heights from an underside of the vehicle but do not extend far enough toward each other, when the door 102 is in a closed configuration that they interfere with each other.

The link 202 may be configured to prevent substantial opening of the door 102. For example, the hook 310 may be an elongate member having a longitudinal axis that is perpendicular to a longitudinal axis of the overall link 202. Engagement of the hook 310 with the through hole of the second bracket 502 may prevent wider opening of the door 102 as the hook pulls the bracket toward the vehicle frame 104.

The hook 310 may help prevent closing of the door 102. The link 202 may be manually engaged with the brackets 302 and/or 502. For example, the hook 310 may push against the second bracket 502. The force received by the hook 310 may be transferred through the longitudinal axis of the link 202. The loop 308 may, in response to the force from the hook 310, be pushed against the first bracket 402. Therefore, the link 202 may act as a column that prevents the door 102 from closing.—To avoid shearing forces on the link 202, the loop 306, and/or the hook 306, the bracket 302 may be circular so that the link 202 pivots with respect to the loop 306 and/or the hook 306 and creates a pivotable joint, e.g., one acts as a fulcrum relative to the other. The link 202 thereby takes only longitudinal loads and shear loads are greatly minimized and even eliminated. Moreover, shear force may be substantially absorbed by the bracket 302. The configuration of the primary plane of the lug of the bracket 302 (the plane in which a hook receiving through-hole is defined) may be at ninety degrees to a longitudinal axes of the loop 308 or a longitudinal axes of the hook 310 to avoid out of plane loads. This configuration assists in the proper distribution of the loads.

The link 202, the first bracket 402 and the second bracket 502 may be an assembly 504 that is attached to a vehicle after the vehicle's construction. For example, the first and second brackets may be welded, bolted, screwed, etc. on a vehicle frame and a vehicle door, respectively, of any existing vehicle. The link may be attached to assembly after the brackets are in place on the vehicle frame and the vehicle door.

Multiple assemblies 504 may be used on a single door. For example, a first assembly 504 may be located near a lower portion of the vehicle 100 and a second assembly 504 may be located near and upper portion of the vehicle. Tertiary assemblies may also be used.

The link 202, the first bracket 402 and the second bracket 502 may be made of a material that has a tensile strength and a compressive strength that is high enough to resist both substantial elastic deformation and plastic deformation. For example, the link 202, the first bracket 402, and/or the second bracket 502 may be steel or aluminum that, under tensile or compressive loads of up to about five hundred pounds, each of the link 202, the first bracket 402 and the second bracket 502 should be able to avoid any plastic deformation and 1% elastic deformation.

The discussion above is directed to certain specific implementations. It is to be understood that the discussion above is only for the purpose of enabling a person with ordinary skill in the art to make and use any subject matter defined now or later by the patent "claims" found in any issued patent herein.

It is specifically intended that the claimed invention is not limited to the implementations and illustrations contained herein but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

In the above detailed description, numerous specific details were set forth in order to provide a thorough understanding of the present disclosure. However, it will be apparent to one of ordinary skill in the art that the present disclosure may be practiced without these specific details. In other instances, well-known methods, procedures, components, circuits and networks have not been described in detail so as not to unnecessarily obscure aspects of the implementation.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the present disclosure herein is for the purpose of describing particular implementations only and is not intended to be limiting of the present disclosure. As used in the description of the present disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. As used herein, the terms "up" and "down"; "upper" and "lower"; "upwardly" and "downwardly"; "below" and "above"; and other similar terms indicating relative positions above or below a given point or element may be used in connection with some implementations of various technologies described herein.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for maintaining a position of a vehicle door relative to a vehicle frame, the apparatus comprising:
    a link comprising:
        a first end having an arc-shaped loop; and
        a second end having a hook, the first end being at an opposite end of the link from the second end; and
    a fastener on a surface of the link configured to directly couple the surface of the link to the vehicle frame, wherein the fastener is a magnetic fastener or a hook and pile fastener.

2. The apparatus of claim 1, wherein the link has a cross section along a longitudinal direction including a width dimension that is no more than twenty percent of a length dimension.

3. The apparatus of claim 2, wherein the link is configured to withstand, in a longitudinal direction, a tensile force of at least four hundred pounds and a compressive force of at least five hundred pounds.

4. The apparatus of claim 1, wherein the hook has a longitudinal axis that is perpendicular to a longitudinal axis of the link.

5. The apparatus of claim 1, wherein the arc-shaped loop is an incomplete circular portion.

6. The apparatus of claim 1, wherein the fastener is half-way between the first end and the second end.

7. The apparatus of claim 6, wherein the fastener is a hook and pile fastener.

8. The apparatus of claim 6, wherein the vehicle frame is a rotorcraft vehicle frame.

9. The apparatus of claim 6, wherein the fastener is a magnetic fastener.

10. An assembly for maintaining a position of a vehicle door relative to a vehicle frame comprising:
   a link having a first end and a second end, the first end having an arc-shaped partial loop, the second end having a hook, and the first end being at an opposite end of the link from the second end;
   a first bracket configured to attach to the vehicle door and engage the arc-shaped partial loop at the first end;
   a second bracket configured to attach to the vehicle frame and to engage the hook at the second end; and
   a fastener on a surface of the link, the fastener configured to the link directly couple the surface of to the vehicle frame, wherein the fastener is a magnetic fastener or a hook and pile fastener.

11. The assembly of claim 10, wherein the link has a cross section along a longitudinal direction including a width dimension that is no more than twenty percent of a length dimension.

12. The assembly of claim 11, wherein the link is configured to withstand, in a longitudinal direction, a tensile force of at least four hundred pounds and a compressive force of at least five hundred pounds.

13. The assembly of claim 10, wherein the vehicle is a rotorcraft.

14. The assembly of claim 10, wherein the hook is an elongate member having a longitudinal axis that is perpendicular to a longitudinal axis of the link.

15. A rotorcraft comprising:
   a door of the rotorcraft;
   a frame of the rotorcraft;
   an assembly for maintaining a position of the door relative to the frame, the assembly comprising a link having a first end and a second end, the first end having an arc-shaped partial loop, the second end having a hook, and the first end at an opposite end of the link from the second end;
   a first bracket attached to the door and configured to engage the partial loop at the first end;
   a second bracket attached to the frame and configured to engage the hook at the second end; and
   a fastener on a surface of the link, the fastener configured to directly couple the surface of the link to the frame.

16. The rotorcraft of claim 15, wherein the link has a cross section along a longitudinal direction including a width dimension that is no more than twenty percent of a length dimension.

17. The rotorcraft of claim 16, wherein the link is configured to withstand, in a longitudinal direction, a tensile force of at least four hundred pounds and a compressive force of at least five hundred pounds.

18. The rotorcraft of claim 15, wherein the fastener is half-way between the first end and the second end, and the fastener is a hook and pile fastener or a magnetic fastener.

19. The rotorcraft of claim 15, wherein the fastener is a magnetic fastener.

20. The rotorcraft of claim 15, wherein the fastener is a hook and pile fastener.

* * * * *